(12) United States Patent
Raider et al.

(10) Patent No.: US 8,720,933 B2
(45) Date of Patent: May 13, 2014

(54) FOOT ACTUATED HITCH PIN ASSEMBLY

(75) Inventors: Kenneth W. Raider, Evansville, IN (US); Jeremy W. Raaf, Richland, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 39 days.

(21) Appl. No.: 13/527,175

(22) Filed: Jun. 19, 2012

(65) Prior Publication Data

US 2013/0334794 A1   Dec. 19, 2013

(51) Int. Cl.
*B60D 1/02*   (2006.01)

(52) U.S. Cl.
USPC ............................................. 280/515

(58) Field of Classification Search
USPC ............................................. 280/515
See application file for complete search history.

(56) References Cited

U.S. PATENT DOCUMENTS

| | | | |
|---|---|---|---|
| 773,537 A * | 11/1904 | Boese et al. | 280/515 |
| 2,459,245 A * | 1/1949 | Seward | 280/515 |
| 2,478,736 A * | 8/1949 | Balzen | 280/477 |
| 2,845,281 A * | 7/1958 | Green et al. | 280/479.3 |
| 4,018,103 A | 4/1977 | Chamberlain | |
| 4,545,596 A * | 10/1985 | Luke et al. | 280/509 |
| 4,549,746 A | 10/1985 | Hager | |
| 5,489,110 A | 2/1996 | VanDusen | |
| 5,740,930 A | 4/1998 | Smit | |
| 7,044,495 B2 | 5/2006 | Van Den Bosch et al. | |
| 7,261,228 B2 | 8/2007 | Prescott et al. | |
| 7,429,057 B2 * | 9/2008 | Johns et al. | 280/477 |
| 8,408,578 B2 * | 4/2013 | Staples | 280/504 |

FOREIGN PATENT DOCUMENTS

| | | | | |
|---|---|---|---|---|
| DE | 3726823 A1 * | 12/1988 | | B60D 1/10 |
| EP | 315731 A1 * | 5/1989 | | B60D 1/02 |

OTHER PUBLICATIONS

Photographs of miscellaneous hitch mechanisms; date: unknown.

* cited by examiner

*Primary Examiner* — Kevin Hurley
(74) *Attorney, Agent, or Firm* — Christopher G. Darrow; Young Basile Hanlon & MacFarlane, P.C.

(57) ABSTRACT

A trailer hitch assembly includes a support bracket having an upper support bushing and a lower support bushing separated from the upper support bushing. A hitch pin slideably engages the upper and lower support bushings. The hitch pin includes a ring shaped actuating collar disposed between the upper and lower support bushings. A release lever pivotally connects to a mounting pin and slideably engages the actuating collar between the upper and lower support bushings. An actuating arm is fixedly attached to the release lever for concurrent rotation therewith about the mounting pin. The release lever may be selectively pivoted around the mounting pin by apply an actuating force to the actuating arm to move the hitch pin between a latched position and an unlatched position. A latch plate attached to the support bracket includes an aperture for receiving the hitch pin when positioned in the latched position.

22 Claims, 6 Drawing Sheets

FOOT ACTUATED HITCH PIN ASSEMBLY

BACKGROUND

Manufacturing facilities may utilize vehicles, such as dollies, to transport equipment, parts and materials throughout the facility. Multiple dollies may be interconnected to form a train. Each interconnected dolly typically employs a hitching mechanism that enables the dollies to be connected and disconnected from one another as desired, depending on a particular need. The hitching mechanism should be robust enough to handle loads that may be encountered, particularly when stringing multiple dollies together in a train. The hitching mechanism typically includes a latching mechanism that may be actuated by an operator when connecting and disconnecting multiples dollies. The latching mechanism may be manually or power actuated. Manually actuated latching mechanisms may be hand or foot actuated. Hand actuation may require an operator to bend over or stoop down to access the latching mechanism, which may be physically stressful when performed over an extended period. Foot actuation of the latching mechanism may also be provided, which generally requires an operator to raise a foot off the ground to access the latching mechanism. Other latching mechanisms, such as power actuated mechanisms, may also be employed, but may result in an undesirable increase complexity and cost of the device.

SUMMARY

The disclosed embodiments include a trailer hitch assembly having a support bracket that includes an upper support bushing and a lower support bushing separated from the upper support bushing. A hitch pin slideably engages the upper and lower support bushings. The hitch pin includes a ring shaped actuating collar disposed between the upper and lower support bushings. A release lever pivotally connects to a mounting pin and slideably engages the actuating collar between the upper and lower support bushings. An actuating arm is fixedly attached to the release lever for concurrent rotation therewith about the mounting pin. The release lever may be selectively pivoted around the mounting pin by apply an actuating force to the actuating arm to move the hitch pin between a latched position and an unlatched position. A latch plate attached to the support bracket includes an aperture for receiving the hitch pin when positioned in the latched position.

BRIEF DESCRIPTION OF THE DRAWINGS

The description herein makes reference to the accompanying drawings wherein like reference numerals refer to like parts throughout the several views, and wherein.

DETAILED DESCRIPTION

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

Figure 1:
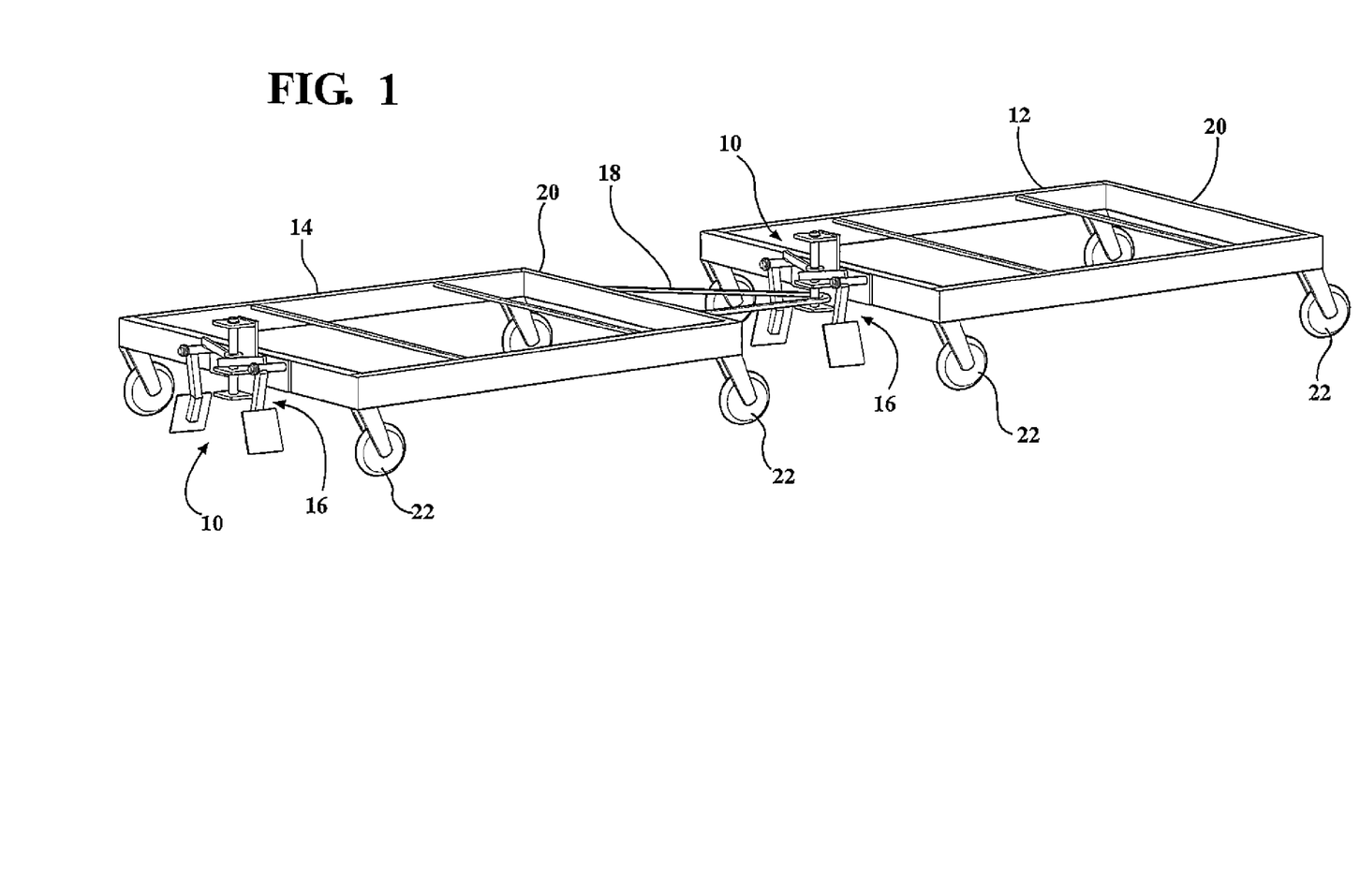
FIG. 1 is a schematic perspective view illustrating an exemplary hitch assembly connecting together two adjacent vehicles.
Figure 2:
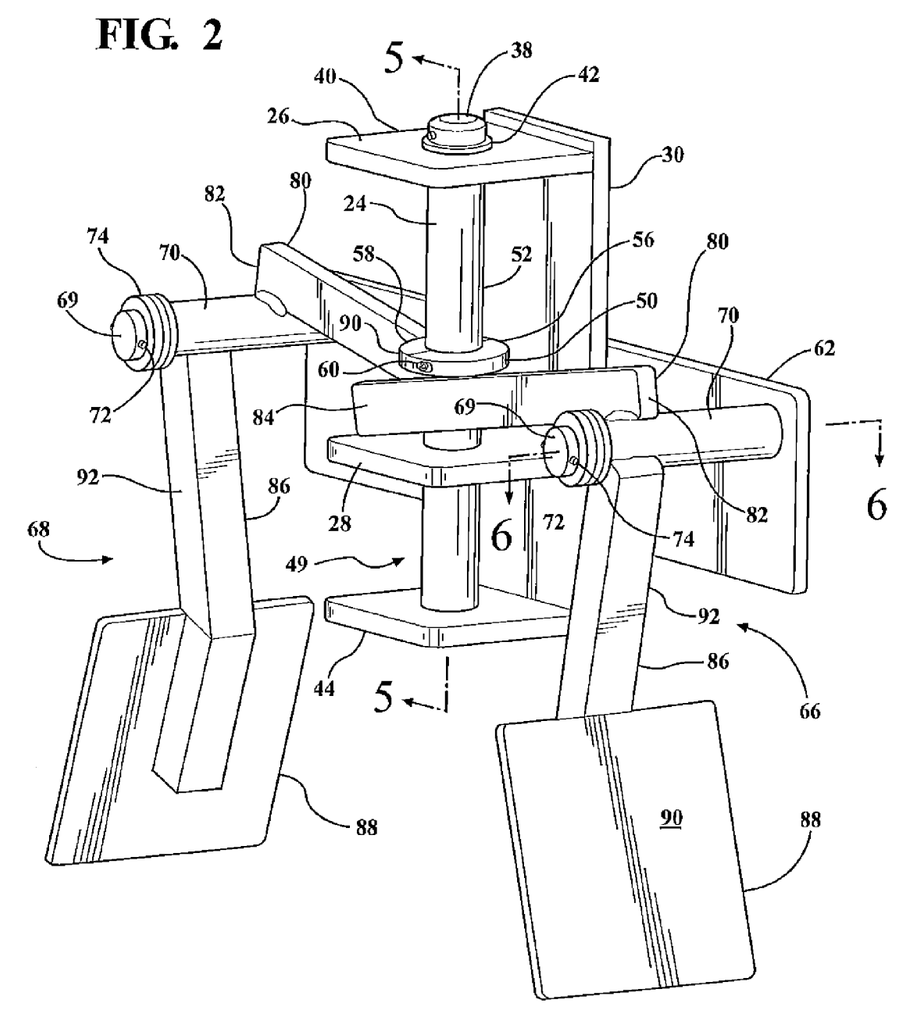
FIG. 2 is a perspective view of the exemplary hitch assembly.

With reference to FIG. 1, an exemplary hitch assembly 10 may be used to selectively connect multiple vehicles together, such as for example, a first vehicle 12 and a second vehicle 14. Hitch assembly 10 may be fixedly attached to one of the vehicles, for example vehicle 12, and includes a releasable latch mechanism 16 that selectively engages a corresponding connector 18 on the other vehicle, for example vehicle 14. The exemplary vehicles 12 and 14 may include various configurations. Vehicles 12 and 14 may be self-propelled, using for example, an onboard power plant, such as an engine or motor, or may require an outside power source for propulsion. For purposes of discussion, vehicles 12 and 14 are schematically depicted in the drawing figures as trailers, such as may be used, for example, in a manufacturing facility to transport equipment and supplies. Exemplary vehicles 12 and 14 may include a frame 20 supported on wheels 22. Hitch assembly 10 may be employed with other vehicle configurations.

With reference to FIGS. 2-6, latch mechanism 16 may include an elongated hitch pin 24 supported by an upper support bushing 26 and a lower support bushing 28. Support bushings 26 and 28 may be attached to a support bracket 30 by any suitable method, such as, for example, welding and brazing, or by the use of fasteners, for example, bolts, screws and rivets. Hitch pin 24 slideably engages an aperture 32 extending through upper support bushing 24 and an aperture 34 extending through lower support bushing 26 (see in particular FIG. 5). Hitch pin 24 is free to move axially along its longitudinal axis and rotate about its longitudinal axis within upper and lower support bushings 26 and 28.

Axial movement of hitch pin 24 relative to upper support bushing 26 may be limited by attaching a roll pin 40 to an aperture extending through an upper end 38 of hitch pin 24. Alternatively, another type fastener may also be employed in place of roll pin 40, such as a cotter pin. A washer 42 may be arranged between roll pin 40 and upper support bushing 26 to provide a bearing surface between the two components.

With continued reference to FIGS. 2-6, hitch assembly 10 may also include a latch plate 44 attached to support bracket 30. Lower support bushing 28 is arranged between upper support bushing 26 and latch plate 44. Latch plate 44 may be attached to support bracket 30 by any suitable method, such as, for example, welding and brazing, or by the use of fasteners, for example, bolts, screws and rivets. A lower end 46 of hitch pin 24 may be selectively engaged and disengaged from an aperture 48 extending through latch plate 44. Lower support bushing 28 and latch plate 44 define a clevis 49 for receiving connector 18 of vehicle 14. Upper and lower support bushings 26 and 28 and latch plate 44 may each have a generally planar plate-like configuration and may be arranged generally parallel to one another.

Hitch pin 24 may include an actuating collar 50 attached to an outer circumference 52 of hitch pin 24 and positioned along a length of hitch pin 24 between upper support bushing 26 and lower support bushing 28. Actuating collar 50 extends generally outward from outer circumference 52 of hitch pin 24, and may be integrally formed with the hitch pin or as a separate component. If formed as a separate component, hitch pin 24 may include a circumferential groove or slot 54 (see in particular FIG. 5) for retaining actuating collar 50. To facilitate assembly, actuating collar 50 may have a split ring configuration that includes a first ring section 56 and a second ring section 58. Actuating collar 50 may be attached to hitch pin 24 by positioning the two ring sections on opposite sides of hitch pin 24 and engaged with slot 54. Actuating collar 50 may be secured to hitch pin 24 by connecting adjacent ends of the two ring sections 56 and 58 together using one or more fasteners 60. Adjacent ends of ring section 56 and 58 may be hingeably connected to ease assembly. The position of actuating collar 50 is generally fixed relative to the axial length of hitch pin 24, but actuating collar 50 may be allowed to rotate within slot 54.

With continued reference to FIGS. 2-6, a mounting bracket 62 may be employed for connecting hitch assembly 10 to a vehicle, for example, first vehicle 12 (FIG. 1). Support bracket 30 may be attached to mounting bracket 62 using various methods, including for example, fasteners, such as bolts and screws, as well as welding and brazing. Alternatively, mounting bracket 62 and support bracket 30 may be integrally formed. Mounting bracket 62 may be secured to a vehicle, for example, first vehicle 12, using bolts, screws, welding, or another suitable connection method.

Figure 7:
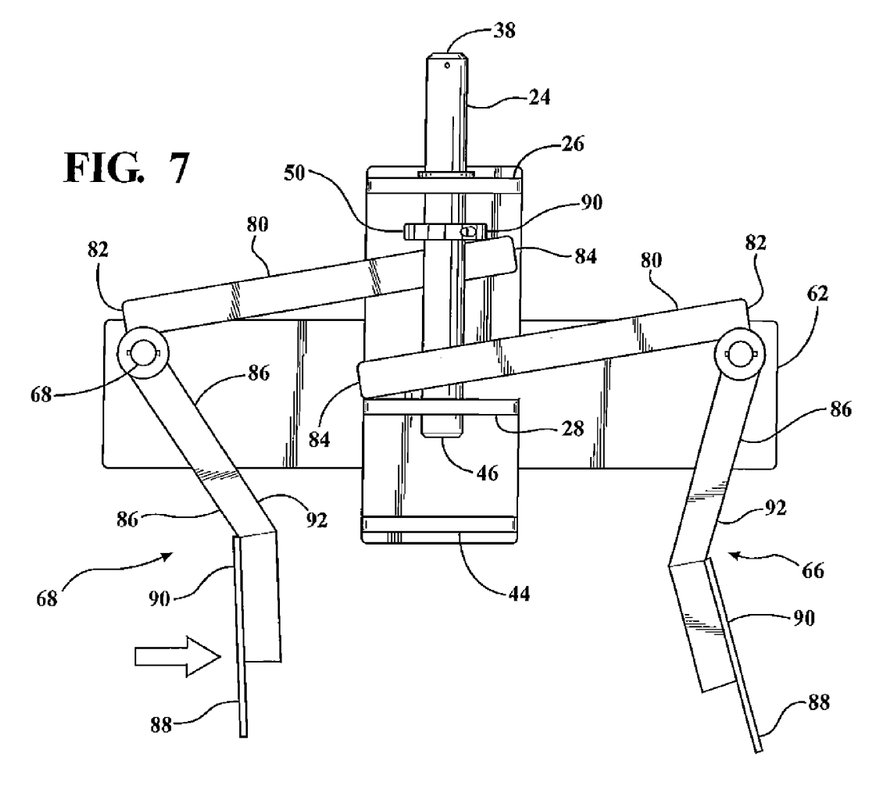
FIG. 7 is a front elevational view of the exemplary hitch assembly arranged in an unlatched position.
Figure 8:
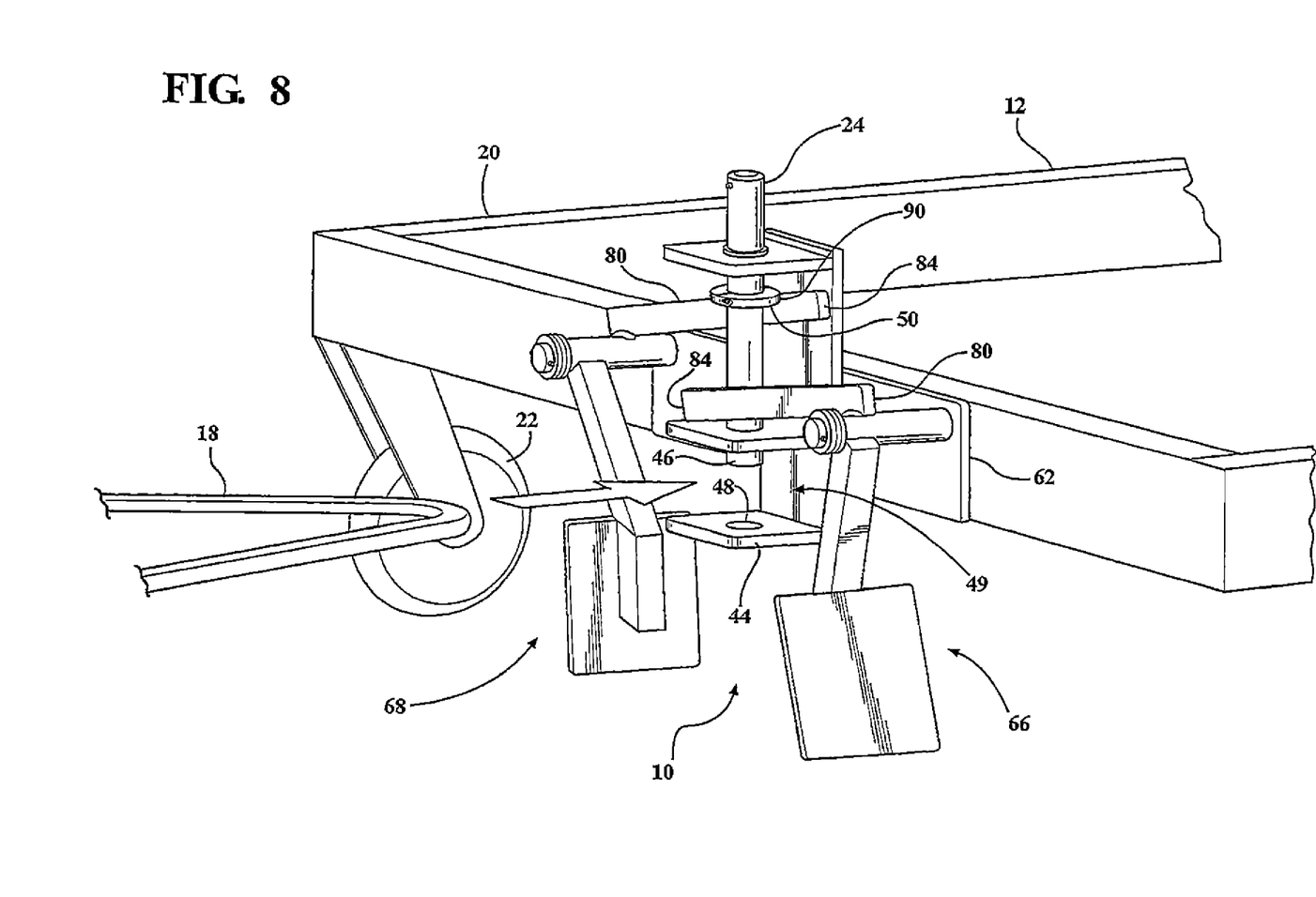
FIG. 8 is a schematic perspective view of the exemplary hitch assembly arranged in the unlatched position in preparation for receiving a connector from an adjacent vehicle.

Hitch assembly 10 may include a right actuating mechanism 66 and a left actuating mechanism 68, each of which may be independently operated for moving hitch pin 24 between a latched position, for example, as shown in FIGS. 2-5, and an unlatched position, for example, FIGS. 7 and 8. Right actuating mechanism 66 and left actuating mechanism 68 may be similarly configured, and thus, for the purpose of discussion, left actuating mechanism 68 will be described subsequently. The description, however, is equally applicable to right actuating mechanism 66.

Left actuating mechanism 68 may be pivotally attached to a mounting pin 69 fixedly attached to mounting bracket 62. Left actuating mechanism 68 includes a generally hollow tubular sleeve 70 rotatably mounted to mounting pin 69. Sleeve 70 may be secured to mounting pin 69 by a roll pin 72 pressed fit into an aperture extending through mounting pin 69. Alternatively, a cotter pin or another connection mechanism may be used to secure sleeve 70 to mounting pin 69. One or more washers 74 may be slideably mounted to mounting pin 69. Washers 74 may be positioned on mounting pin 69 between an end 76 of sleeve 70 (see in particular FIG. 5) and roll pin 72, and between an opposite end 78 of sleeve 70 and mounting bracket 62, for adjusting the positioning of left actuating mechanism 68 relative to hitch pin 24. Three washers are shown arranged between end 76 of sleeve 70 and roll pin 72 in the exemplary configuration illustrated in the drawing figures, but in practice, fewer or more washer may be employed, and one or more washers may be arranged between end 78 of sleeve 70 and mounting bracket 62, as may be required to align left actuating mechanism 68 with hitch pin 24.

Left actuating mechanism 68 includes a release lever 80 having a proximal end 82 fixedly attached to sleeve 70 and an opposite distal end 84 slideably engaging actuating collar 50. Extending generally downward from sleeve 70 is an actuating arm 86 that is fixedly attached to sleeve 70 for concurrent rotation with release lever 80 about mounting pin 69. Release lever 80 and actuating arm 86 may be attached to sleeve 70 using a variety of connection mechanisms, including but not limited to, welding, brazing and fasteners. Actuation arm 86 may be angled relative to the release lever 80, such that an angle defined by a longitudinal axis of actuating arm 86 and a longitudinal axis of the release lever 80 is less than 90 degrees. Attached to an end of actuating arm 86 opposite sleeve 70 is a foot pad 88 that provides a surface 90 for an operator to apply foot pressure to actuate latch mechanism 16. An elongated support member 92 may be used to connect foot pad 88 to sleeve 70. Foot pad 88 may be oriented at an angle relative to a longitudinal axis of support member 92 so as to position foot pad 88 obliquely relative to hitch pin 24. This arrangement positions foot pad 88 for convenient access by an operator.

Also referring to FIGS. 7 and 8, right and left actuating mechanisms 66 and 68 may be actuated by an operator pressing a foot against foot pad 88. This causes right actuating mechanism 68 to rotate clockwise around mounting pin 69 (as viewed from the perspective of FIG. 3) to the unlatched position (as shown, for example, in FIGS. 7 and 8) and left actuating mechanism 68 to rotate counter-clockwise around mounting pin 69 (as viewed from the perspective of FIG. 3) to the unlatched position (as shown, for example, in FIGS. 7 and 8). Releasing the operator's foot from foot pad 88 allows actuating mechanisms 66 and 68 to automatically rotate back to their respective hitched positions, as illustrated, for example, in FIGS. 2-5.

Angling foot pad 88 relative to support member 92 tends to facilitate movement of the actuating mechanisms 66 and 68 from the unlatched position to the latched position by shifting a center of gravity of the respective actuating mechanisms toward hitch pin 24. Moving the center of gravity toward hitch pin 24 tends to increase the rotational torque applied to actuating mechanisms 66 and 66 for returning them to the latched position. Configuring left and right actuating mechanisms 66 and 68 to position the center of gravity between hitch pin 24 and mounting pin 69 may minimize the need for additional mechanical assistance, such as a spring, for biasing actuating mechanisms 66 and 68 toward the latched position. There may be instances, however, where it may be beneficial or desirable to increase the biasing force used to urge actuating mechanisms 66 and 68 toward the latched position beyond what may be provided by gravity alone. In those instances, a biasing member may be employed to provide additional biasing force for returning actuating mechanisms 66 and 68 to the latched position. For example, a coil spring may be mounted on hitch pin 24 between actuating collar 50 and upper support bushing 26. The coil spring would produce a biasing force tending to move actuating collar 50 and attached hitch pin 24 away from upper support bushing 26 and into engagement with aperture 48 in latch plate 44 (i.e., the latched position).

With continued reference to FIGS. 2-6, hitch assembly 10 may be assembled by mounting left actuating mechanism 68 to mounting pin 69 using an appropriate number of washers 74 to properly space left actuating mechanism 68 relative to hitch pin 24. Left actuating mechanism 68 may be secured to mounting pin 69 using roll pin 72. Hitch pin 24 may be mounted to upper support bushing 26 and lower support bushing 28 by positioning hitch pin 24, without actuating collar 50 installed, within aperture 32 in upper support bushing 26 and aperture 34 in lower support bushing 28. With slot 54 of hitch pin 24 positioned between upper support bushing 26 and lower support bushing 28, actuating collar 50 may be attached to hitch pin 24 by positioning the two ring sections 56 and 58 within slot 54 and securing the two ring sections together using fastener 60. The assembled actuating collar 50 should be arranged between release lever 80 of left actuating mechanism 68 and upper support bushing 26. With hitch pin 24 engaged with aperture 32 in upper support bushing 26, and end 38 of hitch pin 24 extending beyond upper support bushing 26, washer 42 may be positioned over end 38 of hitch pin 24 and roll pin 40 may be attached to the aperture extending through end 38 of hitch pin 24. Right actuating mechanism 66 may be similarly mounted to mounting pin 69 and secured in place with roll pin 72. Release lever 80 of right actuating mechanism 66 may be positioned relative to hitch pin 24 using washers 74. Actuating collar 50 should be positioned between release lever 80 of right actuating mechanism 66 and upper support bushing 26.

Figure 3:
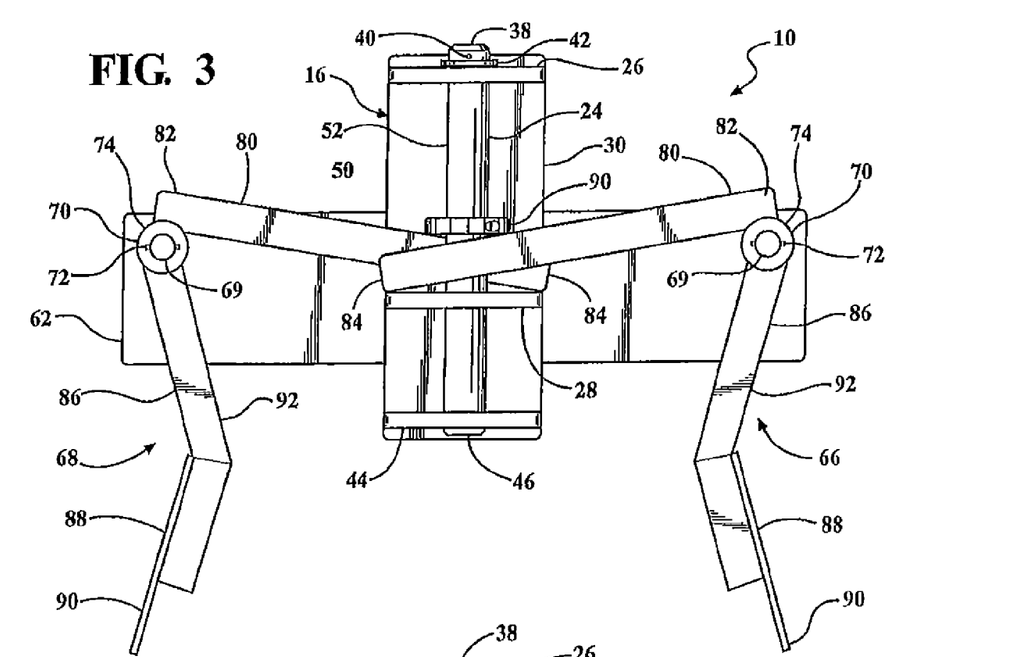
FIG. 3 is a front elevational view of the exemplary hitch assembly arranged in a latched position.
Figure 4:
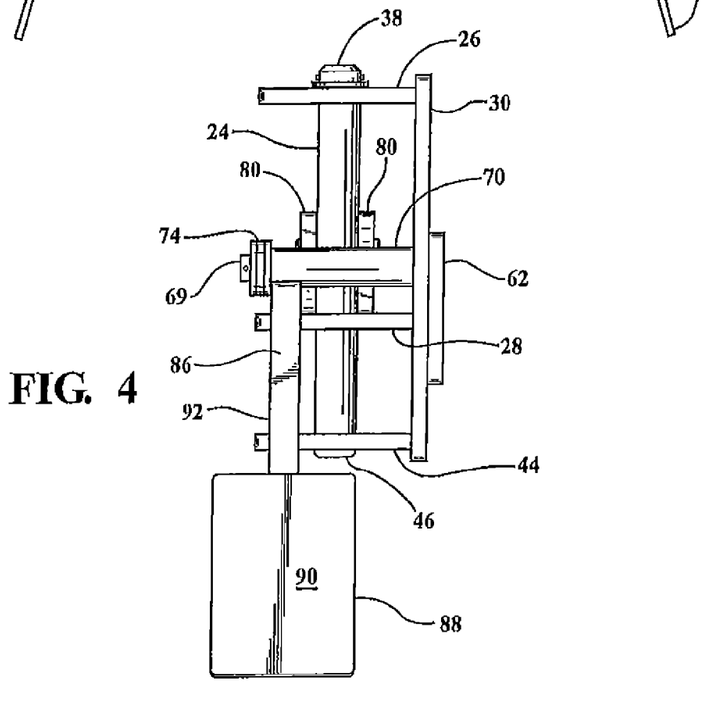
FIG. 4 is a side elevational view of the exemplary hitch assembly.
Figure 5:
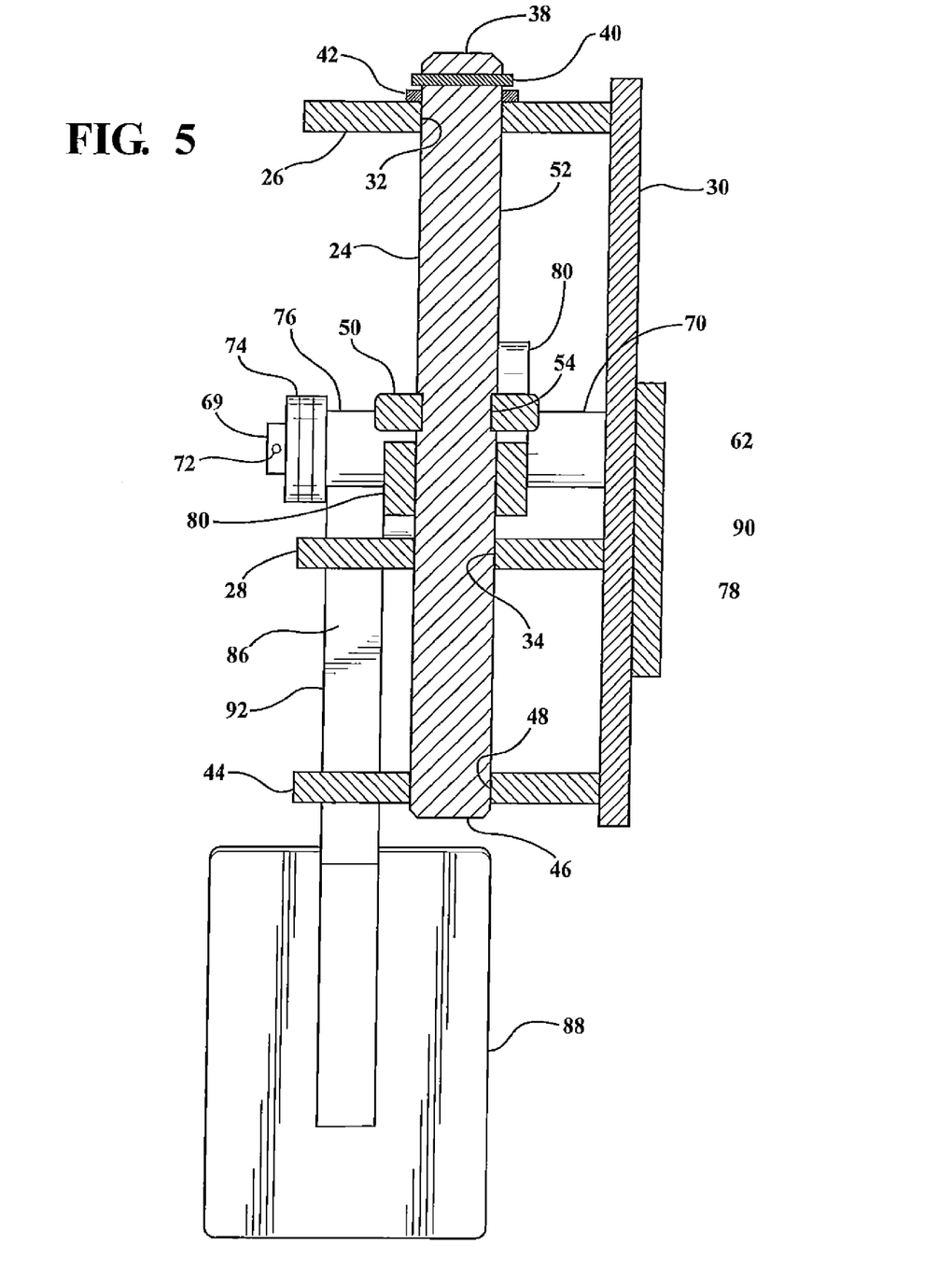
FIG. 5 is partial cross-sectional view of the exemplary hitch assembly taken along section line 5-5 of FIG. 2.
Figure 6:
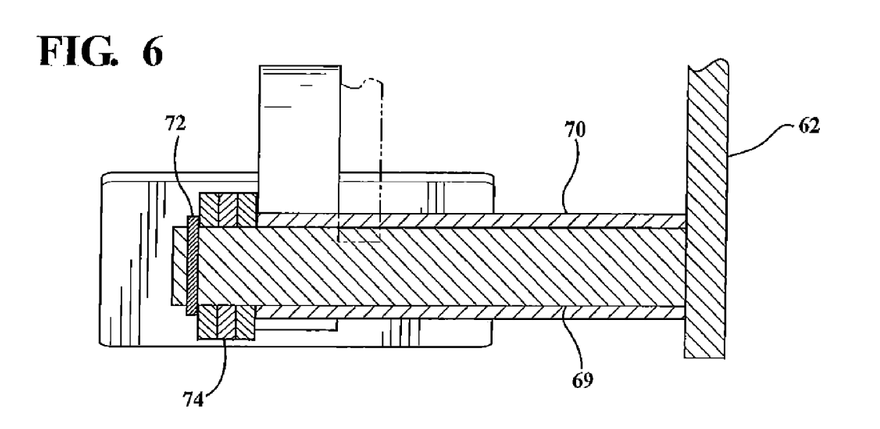
FIG. 6 is partial cross sectional view of the exemplary hitch assemble taken along section line 6-6 of FIG. 2.

With reference to FIGS. 3, 5, 7 and 8, hitch pin 24 may be selectively moved between the latched position, for example, FIGS. 3 and 5, and the unlatched positions, for example, FIGS. 7 and 8, by applying an actuating force to foot pad 88. For example, applying an actuating force to foot pad 88 causes left actuating mechanism 68 to rotate counter-clockwise (as viewed from the perspective of FIG. 3) around mounting pin 69. This in turn causes distal end 84 of release lever 80 to pivot generally upward against actuating collar 50, thereby moving hitch pin 24 from the latched position to the unlatched position. Release lever 80 tends to slide along an outer circumferential edge 90 of actuating collar 50 as hitch pin 24 is moved from the latched to the unlatched position. The circular shape of actuating collar 50 tends to cause hitch pin 24 to rotate about its longitudinal axis when moving hitch pin 24 between the latched and unlatched positions, which may minimize binding between hitch pin 24 and upper and lower support bushings 26 and 28.

With continued reference to FIG. 8, a vehicle, such as vehicle 14 (FIG. 1) may be attached to hitch assembly 10 by positioning connector 18 of vehicle 14 within clevis 49 defined by lower support bushing 28 and latch plate 44, while maintaining hitch pin 24 in the unlatched position. Connector 18 of vehicle 14 may be secured to hitch assembly 10 by releasing foot pad 88 to allow left actuating mechanism 68 (or right actuating mechanism 66, depending on which actuating mechanism is being used) to rotate in a clockwise direction (as viewed from the perspective of FIG. 3), thereby causing distal end 84 of release lever 80 to pivot generally downward, which in turn allows end 46 of hitch pin 24 to slide into engagement with aperture 48 in latch plate 44.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A trailer hitch assembly comprising:
   a support bracket
   an upper support bushing extending from a face of the support bracket;
   a lower support bushing extending from the face of the support bracket and separated from the upper support bushing;
   a hitch pin slideably engaging the upper support bushing and the lower support bushing;
   a mounting pin oriented perpendicular to the face of the support bracket; and
   a release lever pivotally connected to the mounting pin and slideably engaging the hitch pin between the upper and lower support bushings, the release lever operable for moving the hitch pin between a latched position and an unlatched position.

2. The hitch assembly of claim 1, further comprising a latch plate including an aperture for receiving the hitch pin.

3. The hitch assembly of claim 2, wherein the lower support bushing is disposed between the upper support bushing and the latch plate.

4. The hitch assembly of claim 2, wherein the hitch pin engages the aperture when in the latched position and is disengaged from the aperture when in the unlatched position.

5. The hitch assembly of claim 4, wherein the hitch pin engages the upper and lower support bushings when in the unlatched position.

6. The hitch assembly of claim 1, wherein the hitch pin includes a collar disposed between the upper and lower support bushings, the release lever slideably engaging the collar.

7. The hitch assembly of claim 6, wherein the release lever engages an outer circumferential edge of the collar.

8. The hitch assembly of claim 6, wherein the collar includes a generally circular outer edge that slideably engages the release lever.

9. The hitch assembly of claim 1 further comprising an actuating arm rotatably attached to the mounting pin, the orientation of the actuating arm fixed relative to the release lever for concurrent rotation therewith about the mounting pin.

10. The hitch assembly of claim 9, wherein the actuation arm is angled relative to the release lever, such that an angle defined by a longitudinal axis of the actuating arm and a longitudinal axis of the release lever is less than 90 degrees.

11. The hitch assembly of claim 9, wherein the actuation arm includes a foot pad arranged at an oblique angle relative to the hitch pin.

12. The trailer hitch assembly of claim 1, wherein the hitch pin rotatably engages the upper and lower support bushings.

13. The hitch assembly of claim 1, wherein the mounting pin is arranged in substantially a fixed position relative to the upper and lower support bushings.

14. A trailer hitch assembly comprising:

an elongated hitch pin selectively moveable axially along a longitudinal axis of the hitch pin between a latched position and an unlatched position, the hitch pin including a collar extending outward from an outer circumference of the hitch pin; and a plurality of release levers pivotally connected to a plurality of mounting pins, the plurality of release levers slideably engaging the collar for selectively moving the hitch pin between the latched and unlatched positions.

15. The hitch assembly of claim 14 further comprising a lower support bushing and a latch plate displaced away from the lower support bushing, wherein the hitch pin slideably engages the lower support bushing when in the latched and unlatched positions, and engages the latch plate in the latched position and is disengaged from the latch plate in the unlatched position.

16. The hitch assembly of claim 15, wherein the lower support bushing is disposed between the latch plate and the collar.

17. The hitch assembly of claim 16 further comprising an upper support bushing slideably engaging the hitch pin, wherein the collar is disposed between the upper and lower support bushings.

18. The hitch assembly of claim 14 further comprising an actuating arm rotatably attached to one of the plurality of mounting pins, the orientation of the actuating arm fixed relative to one of the plurality of release levers for concurrent rotation therewith about the mounting pin.

19. The hitch assembly of claim 18, wherein the actuation arm includes a foot pad arranged at an oblique angle relative to the hitch pin.

20. The hitch assembly of claim 14, wherein the collar slides axially along a length of one of the plurality of release levers when moving the hitch pin between the latched and unlatched positions.

21. The hitch assembly of claim 14 wherein the hitch pin is rotatable along its longitudinal axis.

22. The hitch assembly of claim 14, wherein the collar includes a generally circular outer edge that slideably engages one of the plurality of release levers.

* * * * *